(12) United States Patent
Nemeth

(10) Patent No.: US 6,727,468 B1
(45) Date of Patent: Apr. 27, 2004

(54) FLEXIBLE HEATING SYSTEM HAVING HIGH TRANSMISSIVITY

(75) Inventor: Paul R. Nemeth, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/922,677

(22) Filed: Aug. 6, 2001

(51) Int. Cl.[7] .................................................. H05B 1/00
(52) U.S. Cl. ........................ 219/209; 219/210; 219/520; 219/539; 349/21; 349/64; 349/72; 338/26; 338/262; 338/320
(58) Field of Search ................................ 219/209, 210, 219/214, 520, 539, 555; 349/21, 64, 72, 161; 338/26, 262, 315, 320

(56) References Cited

U.S. PATENT DOCUMENTS

| | | | |
|---|---|---|---|
| 4,286,377 A | * 9/1981 | Hurko et al. | ................. 29/612 |
| 5,818,010 A | * 10/1998 | McCann | ..................... 219/210 |
| 6,114,809 A | * 9/2000 | Winsor | ......................... 315/50 |
| 6,329,044 B1 | * 12/2001 | Inoue et al. | ................ 428/209 |

* cited by examiner

Primary Examiner—Shawntina Fuqua
(74) Attorney, Agent, or Firm—Nathan O. Jensen; Kyle Eppele

(57) ABSTRACT

A liquid crystal display (LCD) includes an LCD panel providing a surface. A flexible heating system of the invention includes a substantially transparent flexible sheet substrate disposed adjacent the surface of the LCD panel and a substantially transparent resistive heating element formed on the flexible sheet substrate. One or more serpentine shaped thermal sensors are formed in the resistive heating element. Control circuitry coupled to the serpentine shaped thermal sensors and to the substantially transparent resistive heating element and other heaters controls the heating element and other heaters based resistances of the serpentine shaped thermal sensors.

17 Claims, 3 Drawing Sheets

US 6,727,468 B1

FLEXIBLE HEATING SYSTEM HAVING HIGH TRANSMISSIVITY

FIELD OF THE INVENTION

The present invention relates to liquid crystal displays (LCDS) and heater systems for heating LCDs and other devices such as flat lamps.

BACKGROUND OF THE INVENTION

In the past, LCD heater plates have been incorporated to provide a uniform temperature across the LCD surface. The heater has typically been deposited material such as idium tin oxide (ITO) applied to a glass cover placed adjacent to the liquid crystal layer within the display. Electrical current is then passed through the ITO coating across the display face to generate uniform heating. However the thickness and rigidity of the glass cover prevents the use of these heaters with flexible displays and in other environments.

Many available temperature sensors, for providing feedback to thermal control functions related to controlling the LCD heaters, are opaque and too large to be placed within the stacked layers comprising the display. Consequently, the thermal sensors have been placed about the periphery to provide information about the temperature of the LCD material. This method has limitations for determining the temperature of the central portion of the display and the extent of thermal gradients present. Thermal gradients form across the surface of the display due to non-uniform flow of heat from the liquid crystal material to the adjacent environment and display housing.

Thermal sensors designed to be positioned in front of the display are preferably very small so that they are not readily discernable to the eye. For example, thermal sensors can be formed in the ITO coating itself. However, it has been found that the small feature sizes of some such sensors makes it difficult for the sensors to provide the desired temperature sensing accuracy.

Consequently, there exists a need for improved thermal sensing across flexible displays and other heating environments such as flat lamp heaters.

SUMMARY OF THE INVENTION

A flexible or standard (rigid) liquid crystal display (LCD) includes an LCD panel providing a surface. A flexible heating system of the invention includes a substantially transparent flexible sheet substrate disposed adjacent the surface of the LCD panel and a substantially transparent resistive heating element formed on the flexible sheet substrate. One or more serpentine shaped thermal sensors are formed in the resistive heating element. Control circuitry coupled to the serpentine shaped thermal sensors and to the substantially transparent resistive heating element and other heaters controls the heating element and other heaters based on resistances of the serpentine shaped thermal sensors.

DETAILED DESCRIPTION OF AN ILLUSTRATIVE EMBODIMENT

The need for flexible liquid crystal displays (LCDs) in automotive, aircraft, and other applications is increasing. In many such applications, it would be beneficial to efficiently heat the LCD in order to improve performance. However, prior art LCD heaters have been too rigid to be of efficient use. Further, the sensitivity afforded by thermal sensors of prior art heating systems has frequently been too low to control heating of the LCD as precisely as desired. The flexible heating system of the present invention can be used with flexible LCDs, standard LCDs, and in other environments such as flat lamp heating.

Figure 1:
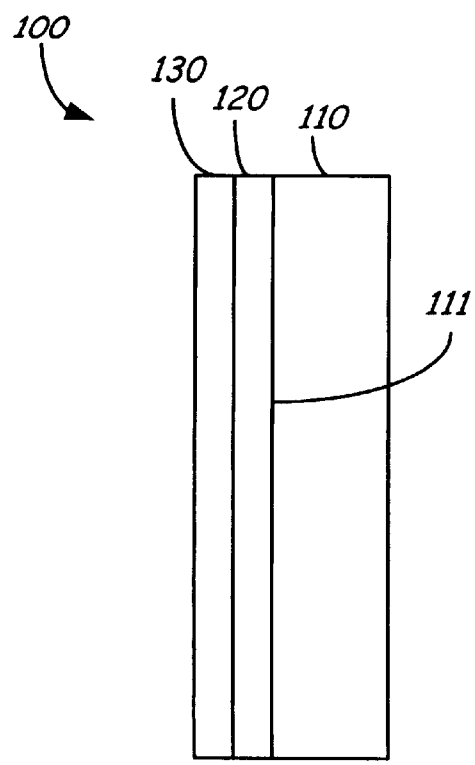
FIG. 1 is a simplified diagrammatic side view of a flexible display heater and LCD containing thermal sensors in accordance with the present invention.

FIG. 1 is a simplified diagrammatic side view of a LCD 100 in accordance with embodiments of the invention. LCD 100 includes LCD panel 110 providing a surface 111, which can be a viewable surface on which information can be displayed or a backside surface opposite the viewable surface. A flexible sheet substrate 120 is disposed on, attached to, or held immediately adjacent to surface 111 of LCD panel 110. A layer of resistive heating material 130 forms a resistive heating element for heating LCD 110 across surface 111.

Flexible sheet substrate 120 is, in some embodiments, a flexible plastic substrate material which is substantially transparent. Substantially transparent flexible sheet substrate is intended to represent any flexible sheet substrate material which is at least 75% transmissive at visible wavelengths of light. For example, in one embodiment, flexible sheet substrate 120 is a flexible plastic substrate material commercially available from 3M Company under the name "Plastic Film Conductor". This material is 85% transmissive at a wavelength of 550 nm. Although this is a good material for use as flexible sheet substrate 120, other flexible sheet substrate material which are substantially or largely transparent can be used.

Layer 130 of resistive heating material which acts as or provides a resistive heating element can be any of a variety of substantially transparent resistive materials which generate heat in response to current flow therethrough. In some embodiments, substantially transparent resistive heating material 130 is a sheet of ITO. ITO can be very transmissive (for example 88% transmissive in the visible spectrum), but generally any suitable heating material having a transmissivity of at least about 75% could be used. For most purposes, the higher the transmissivity, the better. Flexible sheet substrate 120 and the substantially transparent resistive heating element provided by layer 130 of ITO provide a flexible heater for use with a LCD panel 110. The present invention further includes a thermal sensor design which provides enhanced control of thermal gradients across surface 111 of LCD panel 110.

Figure 2:
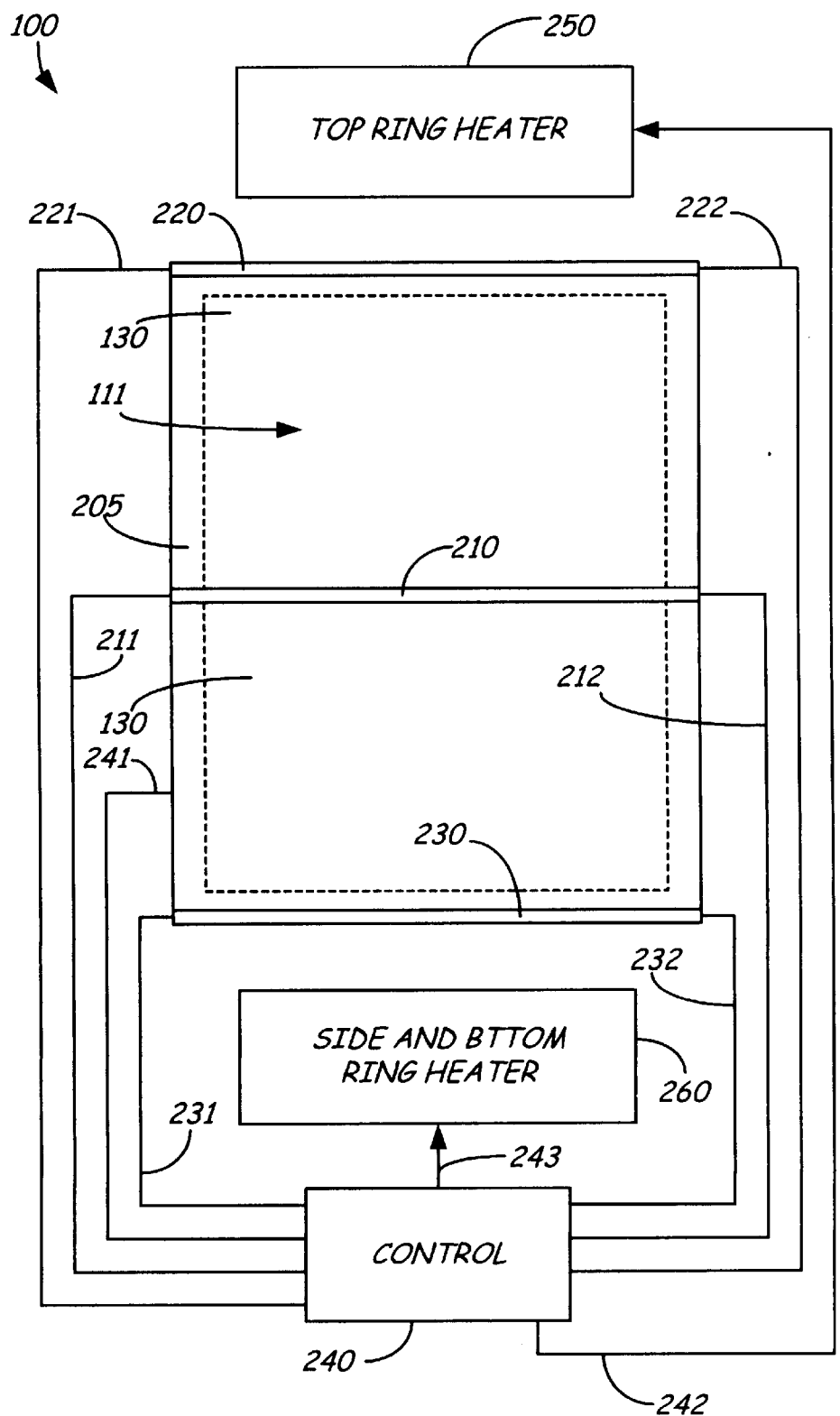
FIG. 2 is a simplified diagrammatic front view of the flexible display heater and LCD shown in FIG. 1, and further showing other heaters and controls.

FIG. 2 is a simplified diagrammatic front view of LCD 100 and the flexible display heater used therein and provided by flexible sheet substrate 120 and the resistive heating layer 130. Surface 111 designated in FIG. 2 can be considered to represent the viewable surfaces of flexible substrate 120 and layer 130 of resistive heating material. Surface 111 can also represent a surface opposite the viewable surface on the LCD panel. Surface 111 includes a non-viewable surface periphery 205 disposed therearound. A first thermal sensor 210 is positioned in a central (from top to bottom) region of surface 111 and is formed in the resistive heating element or layer 130. A second thermal sensor 220 is formed in resistive heating element 130 adjacent a top region of the surface 111. A third thermal sensor 230 is formed in resistive heating element 130 adjacent a bottom region of surface 111. As discussed, each of thermal sensors 210, 220 and 230 is formed in the sheet of resistive heating material which provides the heating element 130. The thermal sensors are formed by removing portions of the ITO or other resistive material to form two traces (per thermal sensor) which electrically isolate the thermal sensor from remaining portions of heating element 130. Also as discussed below with reference to FIG. 3, each of the thermal sensors 210, 220 and 230 has a serpentine shape in order to allow a majority of the sensor's resistance to be concentrated in specific regions (i.e., the center of the panel).

Control circuitry 240 is provided in LCD 100 for controlling the resistive heating element 130 (frequently divided into separate zones for instance by thermal sensor 210), a top ring heater 250 and a side and bottom ring heater 260. Control circuitry 240 is electrically coupled to thermal sensor 210 via lines or connections 211 and 212, and generates control signals 241 to control resistive heating element 130 based upon a resistance of thermal sensor 210. Control circuitry 240 is electrically coupled to thermal sensor 220 via electrical lines or connections 221 and 222, and generates control signals 242 to control ring heater 250 based upon a resistance of thermal sensor 220. Control circuitry 240 is electrically coupled to thermal sensor 230 via electrical lines or connections 231 or 232, and generates control signals 243 to control side and bottom ring heater 260 based upon a resistance of thermal sensor 230.

Figure 3:
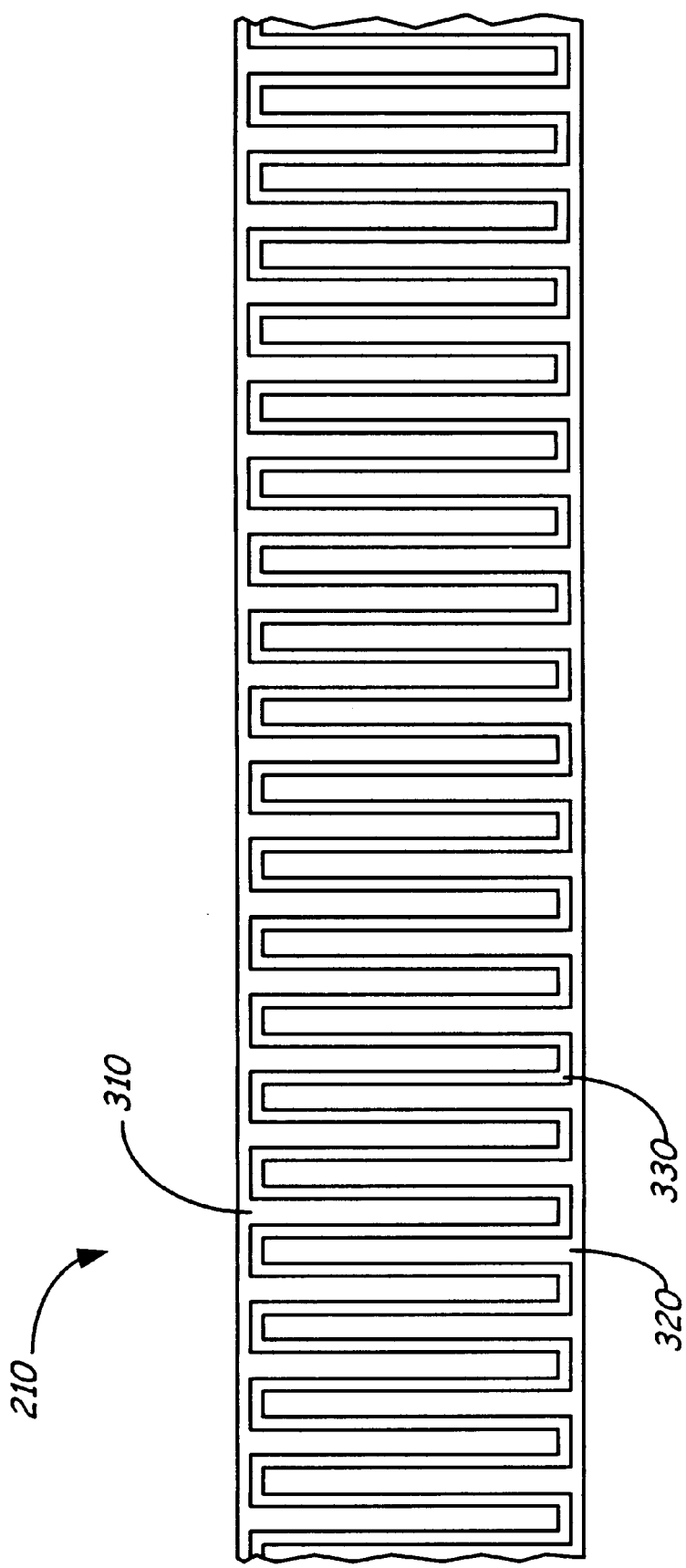
FIG. 3 is a greatly enlarged diagrammatic illustration of a serpentine shaped thermal sensor in accordance with embodiments of the invention.

FIG. 3 is a greatly enlarged diagrammatic illustration of the serpentine shaped thermal sensors used in the LCDs and heating systems of the invention. Shown in FIG. 3 is a single thermal sensor 210. However, each thermal sensor used to sense a temperature of surface 111 has a similar serpentine shape. The size of the serpentine shape is derived based upon ITO (or other resistive heating material) sheet resistance and system requirements for overall thermistor resistance.

Thermal sensor 210, as well as the other thermal sensors, are formed in the sheet or resistive material which provides resistive heating element 130. Thermal sensor 210 is formed in a serpentine shape by removing portions of the ITO or resistive material in two separate trace patterns 310 and 320. The ITO or resistive material can be removed using, for example, a laser or a photolithography process. Generally, the traces 310 and 320 should be around 0.0050 inches thick or narrower in order to minimize the visibility of thermal sensor 210 to a user of the LCD. This is necessary because, whereas ITO has a transmissivity of approximately 88% in some embodiments, the areas where the ITO has been removed to form traces 310 and 320 will have a transmissivity of approximately 100% (i.e., the user will be looking through only the flexible substrate 120).

By forming traces 310 and 320 in the layer of resistive material, a serpentine shaped resistor 330 is left on the surface of flexible substrate 120, thus forming thermal sensor 210 in a serpentine shape. The serpentine shape of thermal sensor 210 provides a highly concentrated resistance in the control region of surface 111, thereby allowing more precise control of the heaters.

Figure 4:
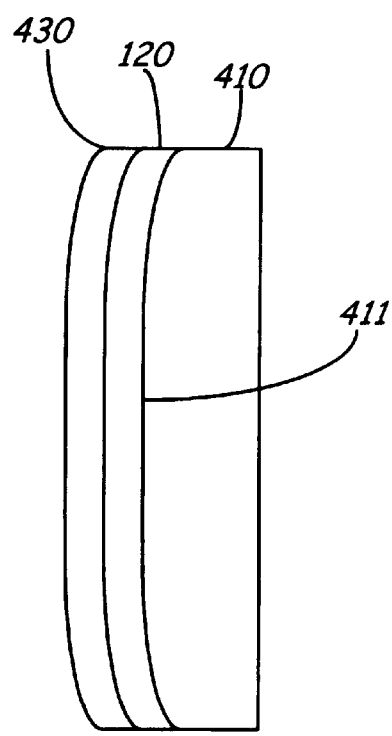
FIG. 4 is a simplified side view of a flexible transparent heater for a flat lamp or other type of fluorescent lamp.

FIG. 4 is a diagrammatic side view illustrating a flexible heating system for use with a fluorescent lamp or flat lamp 410 in embodiments of the invention. Fluorescent lamps such as flat lamps and other technologies frequently require some form of heating in order to improve efficiency and dimmable operating range. By forming a layer of resistive material 430, which can be ITO as was the case with resistive material 130 shown in FIG. 1, on flexible substrate 120, a flexible heating system is provided which can be attached to a non-planar surface 411 of lamp 410. Thus, the heating system can more efficiently supply thermal energy directly to the lamp. At the same time, the substantially transparent nature of flexible substrate 120 and layer 430 of resistive heating material allows a majority of light generated by lamp 410 to be transmitted for use in backlighting an LCD. The flexible heating system shown in FIG. 4 also includes one or more serpentine thermal sensors, such as thermal sensor 210 shown in FIG. 3, formed in the resistive heating element provided by layer 430. Still other uses are available for the flexible heating systems of the present invention.

Although the present invention has been described with reference to illustrative embodiments, workers skilled in the art will recognize that changes may be made in form and detail without departing from the spirit and scope of the invention.

What is claimed is:

1. A liquid crystal display (LCD) comprising:
   an LCD panel providing a surface;
   a flexible heating system comprising:
      a substantially transparent flexible sheet substrate disposed adjacent the surface of the LCD panel;
      a substantially transparent resistive heating element formed on the flexible sheet substrate; and
      a first serpentine shaped thermal sensor formed in and from a portion of the resistive heating element; and
      control circuitry coupled to the serpentine shaped thermal sensor and to the substantially transparent resistive heating element, the control circuitry controlling the substantially transparent resistive heating element based upon a resistance of the serpentine shaped thermal sensor.

2. The LCD of claim 1, wherein the substantially transparent resistive heating element comprises a layer of indium tin oxide (ITO).

3. A liquid crystal display (LCD) comprising:
   an LCD panel providing a surface;
   a flexible heating system comprising:
      a substantially transparent flexible sheet substrate disposed adjacent the surface of the LCD panel;
      a substantially transparent resistive heating element formed on the flexible sheet substrate;
      a first serpentine shaped thermal sensor formed in the resistive heating element;
      control circuitry coupled to the serpentine shaped thermal sensor and to the substantially transparent resistive heating element, the control circuitry controlling the substantially transparent resistive heating element based upon a resistance of the serpentine shaped thermal sensor;
      wherein the substantially transparent resistive heating element comprises a layer of indium tin oxide (ITO); and
      wherein the first serpentine shaped thermal sensor is formed in the layer of ITO between two traces comprised of removed portions of the layer of ITO.

4. The LCD of claim 3, wherein the first serpentine shaped thermal sensor is formed in the resistive heating element adjacent a central region of the surface of the LCD panel.

5. The LCD of claim 4, and further comprising a second serpentine shaped thermal sensor formed in the resistive heating element adjacent a top region of the surface of the LCD panel and coupled to the control circuitry.

6. The LCD of claim 5, and further comprising a first ring heater positioned adjacent the top region of the surface of the LCD panel and coupled to the control circuitry, the control circuitry controlling the first ring heater based upon a resistance of the second serpentine shaped thermal sensor.

7. The LCD of claim 6, and further comprising a third serpentine shaped thermal sensor formed in the resistive heating element adjacent a bottom region of the surface of the LCD panel and coupled to the control circuitry.

8. The LCD of claim 7, and further comprising a second ring heater positioned adjacent bottom and side regions of the surface of the LCD panel and coupled to the control circuitry, the control circuitry controlling the second ring heater based upon a resistance of the third serpentine shaped thermal sensor.

9. A heating system comprising:
a substantially transparent flexible sheet substrate;
a layer of substantially transparent resistive heating material formed on the flexible sheet substrate and providing a heating element;
a serpentine shaped thermal sensor formed in and from a portion of the layer of substantially transparent resistive heating material; and
control circuitry coupled to the serpentine shaped thermal sensor and to the heating element provided by the layer of substantially transparent resistive heating material, the control circuitry controlling the heating element based upon a resistance of the serpentine shaped thermal sensor.

10. The heating system of claim 9, wherein layer of substantially transparent resistive heating material comprises a layer of indium tin oxide (ITO).

11. A heating system comprising:
a substantially transparent flexible sheet substrate;
a layer of substantially transparent resistive heating material formed on the flexible sheet substrate and providing a heating element;
a serpentine shaped thermal sensor formed in the layer of substantially transparent resistive heating material;
control circuitry coupled to the serpentine shaped thermal sensor and to the heating element provided by the layer of substantially transparent resistive heating material, the control circuitry controlling the heating element based upon a resistance of the serpentine shaped thermal sensor;
wherein layer of substantially transparent resistive heating material comprises a layer of indium tin oxide (ITO); and
wherein the serpentine shaped thermal sensor is formed in the layer of ITO between two traces comprised of removed portions of the layer of ITO.

12. The heating system of claim 9, and further comprising a fluorescent lamp, wherein the substantially transparent flexible sheet substrate is attached to a surface of the fluorescent lamp.

13. The heating system of claim 9, and further comprising a flat lamp, wherein the substantially transparent flexible sheet substrate is attached to a surface of the flat lamp.

14. A heating system for a display device, the heating system comprising:
a substantially transparent substrate disposed outwardly of a display generating surface of the display device, wherein said display generating surface has a central viewable area and a periphery;
a substantially transparent resistive heating element disposed on said substantially transparent substrate;
a serpentine shaped thermal sensor disposed on a portion of said substantially transparent substrate which is disposed outwardly of said central viewable area;
control circuitry coupled to said serpentine shaped thermal sensor and to the substantially transparent resistive heating element; and,
the control circuitry configured so as to control said substantially transparent heating element in response to an electrical impedance of said serpentine shaped thermal sensor.

15. A heating system of claim 14 wherein said display generating surface is a component of a liquid crystal display device.

16. A heating system of claim 14 wherein said serpentine shaped thermal sensor is disposed in a void in said substantially transparent resistive heating element.

17. A heating system comprising:
a substantially transparent substrate;
a substantially transparent resistive heating element disposed on said substantially transparent substrate;
a serpentine shaped thermal sensor disposed on said substantially transparent substrate;
control circuitry coupled to said serpentine shaded thermal sensor and to the substantially transparent resistive heating element;
the control circuitry configured so as to control said substantially transparent heating element in response to an electrical impedance of said serpentine shaded thermal sensor;
wherein said serpentine shaped thermal sensor is disposed in a void in said substantially transparent resistive heating element; and
wherein said substantially transparent resistive heating element and said serpentine shaped thermal sensor are each made of an identical resistive material of substantially similar thickness disposed on said substantially transparent substrate.

* * * * *